US012744347B2

(12) United States Patent
Weaver et al.

(10) Patent No.: US 12,744,347 B2
(45) Date of Patent: Sep. 22, 2026

(54) POWER RECEPTACLE ASSEMBLY AND METHOD OF ASSEMBLING A POWER RECEPTACLE ASSEMBLY

(71) Applicant: TE Connectivity Solutions GmbH, Schaffhausen (CH)

(72) Inventors: Brian Keith Weaver, Harrisburg, PA (US); Matthew William Broadbent, Millerstown, PA (US); William James Moyer, II, Selinsgrove, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 349 days.

(21) Appl. No.: 18/480,566

(22) Filed: Oct. 4, 2023

(65) Prior Publication Data

US 2025/0118925 A1 Apr. 10, 2025

(51) Int. Cl.

*H01R 13/516* (2006.01)
*H01R 4/18* (2006.01)
*H01R 12/70* (2011.01)
*H01R 13/506* (2006.01)

(52) U.S. Cl.

CPC ........... *H01R 13/516* (2013.01); *H01R 4/185* (2013.01); *H01R 12/7088* (2013.01); *H01R 13/506* (2013.01)

(58) Field of Classification Search

None
See application file for complete search history.

(56) References Cited

U.S. PATENT DOCUMENTS

| | | | | |
|---|---|---|---|---|
| 5,697,819 A * | 12/1997 | Hatagishi | H01R 13/501 | 439/752 |
| 7,147,503 B2 * | 12/2006 | Shindo | H01R 13/6277 | 439/942 |
| 9,231,338 B2 * | 1/2016 | Nagy | H01R 13/5812 | |
| 10,249,976 B1 * | 4/2019 | Thomas | H01R 13/562 | |
| 10,855,024 B2 * | 12/2020 | Humphrey | H01R 13/501 | |
| 2006/0128172 A1 * | 6/2006 | Chien | H01R 43/16 | 439/63 |
| 2024/0039187 A1 * | 2/2024 | Brekosky | H01R 13/501 | |
| 2024/0380160 A1 * | 11/2024 | Miwa | H01R 13/6277 | |

* cited by examiner

*Primary Examiner* — Oscar C Jimenez

(57) ABSTRACT

A power receptacle assembly includes a receptacle housing holding a power terminal including a socket at a mating end and a crimp barrel crimped to a power cable. The power receptacle assembly includes a rear cover coupled to the rear of the receptacle housing. Optionally, the rear cover includes a TPA element received in the cavity to interface with and assure proper positioning of the power terminal in the cavity. Optionally, the rear cover is fed on a carrier strip with a plurality of the rear covers with connecting strips therebetween, wherein the rear cover is singulated from the connecting strips to separate the rear cover from the carrier strip for coupling to the rear of the receptacle housing.

20 Claims, 4 Drawing Sheets

POWER RECEPTACLE ASSEMBLY AND METHOD OF ASSEMBLING A POWER RECEPTACLE ASSEMBLY

BACKGROUND OF THE INVENTION

The subject matter herein relates generally to power receptacle assemblies.

The power receptacle assemblies are used in various different applications used to provide power to components. For example, power receptacle assemblies may be used in appliances, automotive applications, industrial applications, and the like. The power receptacle assembly typically includes a housing holding a terminal that is electrically connected to a power cable. Problems may arise with assembly of the terminal in the housing. For example, if the terminal is improperly loaded into the housing, a poor or bad electrical connection may occur. The electrical connection with the mating connector may fail over time if the terminal is improperly located within the housing. Some known power receptacle assemblies provide a cover to hold the terminal in the housing. However, connectors having covers are not without disadvantages. For instance, assembly may be difficult or time-consuming. The cover may not properly secure the terminal in the housing. Repair or replacement of components of the connector may be difficult after cover installation.

A need remains for a power receptacle assembly that may be manufactured in a cost effective and reliable manner.

BRIEF DESCRIPTION OF THE INVENTION

In one embodiment, a power receptacle assembly is provided and includes a receptacle housing that has housing walls forming a cavity. The receptacle housing extends between a front and a rear. The receptacle housing has a front opening at the front configured to receive a mating power contact. The receptacle housing has a rear opening at the rear. The receptacle housing includes a power cable exit. The power receptacle assembly includes a power cable that extends from the power cable exit. The power receptacle assembly includes a power terminal received in the cavity through the rear opening. The power terminal has a socket at a mating end configured to be mated with the mating power contact. The power terminal includes a crimp barrel crimped to the power cable. The power receptacle assembly includes a rear cover coupled to the rear of the receptacle housing to cover the rear opening. The rear cover includes a terminal position assurance (TPA) element. The TPA element received in the cavity to interface with the power terminal and assure proper positioning of the power terminal in the cavity.

In another embodiment, a power receptacle assembly is provided and includes a receptacle housing that has housing walls forming a cavity. The receptacle housing extends between a front and a rear. The receptacle housing has a front opening at the front configured to receive a mating power contact. The receptacle housing has a rear opening at the rear. The receptacle housing includes a power cable exit. The power receptacle assembly includes a power cable that extends from the power cable exit. The power receptacle assembly includes a power terminal received in the cavity through the rear opening. The power terminal has a socket at a mating end configured to be mated with the mating power contact. The power terminal includes a crimp barrel crimped to the power cable. The power receptacle assembly includes a rear cover configured to be coupled to the rear of the receptacle housing to cover the rear opening. The rear cover is fed on a carrier strip with a plurality of the rear covers with connecting strips between the rear covers. The rear cover is configured to be singulated from the connecting strips to separate the rear cover from the carrier strip for coupling to the rear of the receptacle housing.

In a further embodiment, a method of assembling a power receptacle assembly is provided. The method provides a receptacle housing has housing walls to form a cavity. The receptacle housing extends between a front and a rear. The receptacle housing has a front opening at the front configured to receive a mating power contact. The receptacle housing has a rear opening at the rear. The receptacle housing includes a power cable exit. The method loads a power terminal in the cavity through the rear opening such that a socket of the power terminal faces the front opening for mating with the mating power contact and such that a crimp barrel of the power terminal faces the rear opening. The method presents a carrier strip that has a plurality of rear covers connected in series by connecting strips. The method singulates one of the rear covers from the carrier strip by separating the rear cover from the connecting strips. The method couples the separated rear cover to the rear of the receptacle housing to cover the rear opening to hold the power terminal in the cavity.

DETAILED DESCRIPTION OF THE INVENTION

Figure 1:
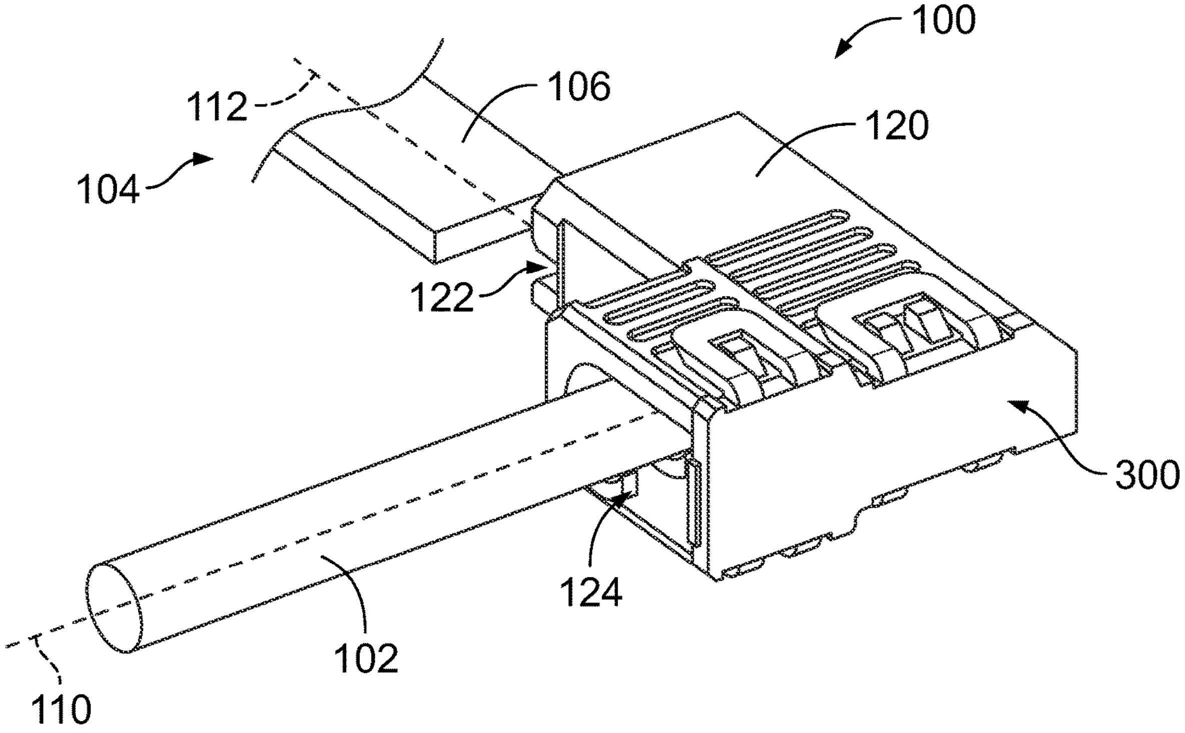
FIG. 1 illustrates a power receptacle assembly in accordance with an exemplary embodiment.

FIG. 1 illustrates a power receptacle assembly 100 in accordance with an exemplary embodiment. The power receptacle assembly 100 is provided at an end of a power cable 102. The power receptacle assembly 100 is configured to be mated with a mating connector 104 and is configured to receive a mating power contact 106 of the mating connector 104. The mating power connector 106 is configured to be plugged into the power receptacle assembly 100. The power receptacle assembly 100 may be used to power appliances. For example, the mating connector 104 may be provided at the appliance and the power receptacle assembly 100 is coupled to the mating connector 104 to supply power to the appliance. The power receptacle assembly 100 may be used in other applications in alternative embodiments, such as an automotive application, and industrial application, or another type of application.

In an exemplary embodiment, the power receptacle assembly 100 is a right angle connector. For example, the power cable 102 may extend along a cable axis 110 and the power receptacle assembly 100 is mated with the mating connector 104 along the mating axis 112 perpendicular to the cable axis 110. Other orientations are possible in alternative embodiments. In an exemplary embodiment, the power receptacle assembly 100 is a flag connector having flag terminal orientations. In an exemplary embodiment, the power receptacle assembly 100 includes a socket terminal configured to be mated with the mating power contact 106. For example, the mating power contact 106 may be a tab or blade type contact.

The power receptacle assembly 100 includes a receptacle housing 120 that receives the power cable 102 and a power terminal 200. In an exemplary embodiment, the power terminal 200 is a socket terminal; however, the power terminal 200 may be another type of power terminal in alternative embodiments, such as a pin terminal, a blade terminal, a spring beam terminal, and the like. The receptacle housing 120 includes a cavity 122 that receives the end of the power cable 102 and the power terminal 200. The receptacle housing 120 includes a power cable exit 124, such as at one of the sides of the receptacle housing 120. The power cable 102 exits the receptacle housing 120 through the power cable exit 124.

The power receptacle assembly 100 includes a rear cover 300 coupled to the receptacle housing 120 to cover the power terminal 200. In an exemplary embodiment, the rear cover 300 holds the power terminal 200 in the cavity 122 of the receptacle housing 120. In an exemplary embodiment, the rear cover 300 includes a terminal position assurance (TPA) element 310 (shown in FIG. 2) that interfaces with the power terminal 200 and assures proper positioning of the power terminal 200 in the cavity 122. In an exemplary embodiment, the rear cover 300 is removably coupled to the receptacle housing 120 to allow opening of the receptacle housing 120 for repair or replacement of the components. For example, the rear cover 300 may be latchably coupled to the receptacle housing 120.

Figure 2:
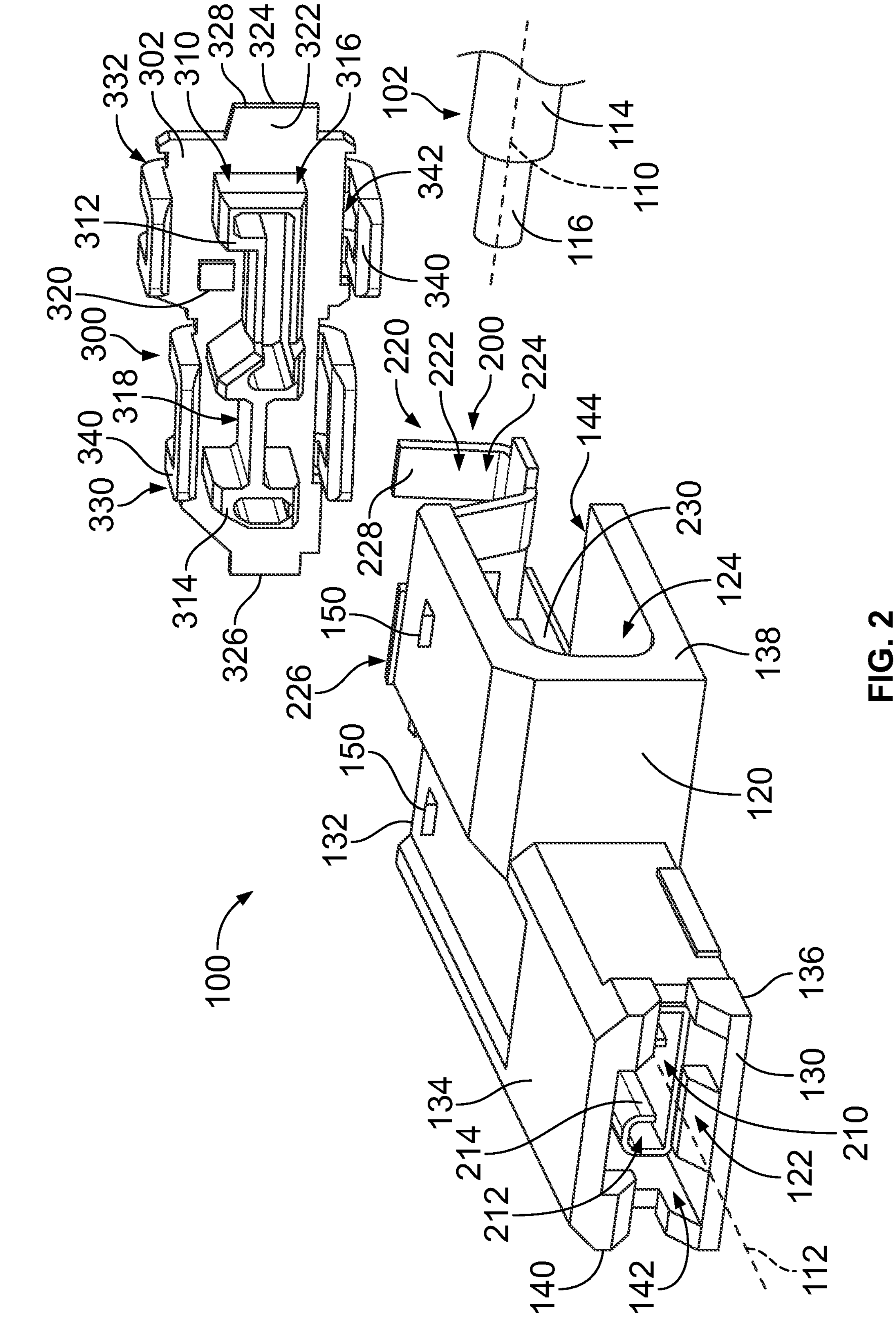
FIG. 2 is an exploded view of the power receptacle assembly in accordance with an exemplary embodiment.

FIG. 2 is an exploded view of the power receptacle assembly 100 in accordance with an exemplary embodiment. FIG. 2 illustrates the receptacle housing 120, the power terminal 200, the power cable 102, and the rear cover 300. During assembly, the power cable 102 is terminated to the power terminal 200. The power cable 102 and the power terminal 200 are configured to be loaded into the cavity 122 of the receptacle housing 120. The rear cover 300 may be coupled to the receptacle housing 120 after the power terminal 200 is loaded into the cavity 122.

In an exemplary embodiment, the receptacle housing 120 is manufactured from a dielectric material, such as a plastic material. In various embodiments, the receptacle housing 120 may be a molded part, such as a molded plastic part. The receptacle housing 120 extends between a front 130 and a rear 132. The front 130 is a mating end of the receptacle housing 120 configured to be mated with the mating connector 104 (FIG. 1). The receptacle housing 120 includes a top 134 and a bottom 136. The receptacle housing 120 includes a first side 138 and a second side 140. In the illustrated embodiment, the power cable exit 124 is provided at the second side 140. However, the power cable exit 124 may be located at another location in alternative embodiments, such as the rear 132, the top 134, the bottom 136, or the first side 138. In an exemplary embodiment, the receptacle housing 120 is L-shaped or flag shaped. For example, the receptacle housing 120 may be wider at the rear 132 and narrower at the front 130. The wider portion of the receptacle housing 120 accommodates the power terminal 200 and the power cable 102. The narrower portion of the receptacle housing 120 is configured to be mated with the mating connector 104. For example, the narrower portion at the front 130 may be plugged into the appliance or other device to mate with the mating connector 104.

The receptacle housing 120 includes a front opening 142 at the front 130 and a rear opening 144 at the rear 132. The rear opening 144 is configured to receive the power terminal 200 during assembly. The rear cover 300 is configured to be coupled to the receptacle housing 120 to close or cover the rear opening 144. The front opening 142 provides access to the cavity 122 and the power terminal 200 in the cavity 122 for mating the mating power contact 106 with the power terminal 200. In various embodiments, the front opening 142 is a slot configured to receive the plate portion of the mating power contact 106. The receptacle housing 120 may include guide features at the front opening 142 to guide the mating power contact 106 into the front opening 142.

In an exemplary embodiment, the receptacle housing 120 includes latching elements 150 for securing the rear cover 300 to the receptacle housing 120. In various embodiments, the latching elements 150 are located along the top 134 and/or the bottom 136. The latching elements 150 may be catch features, such as a protrusion including a ramp surface at a catch surface configured to receive a latch of the rear cover 300. The latching elements 150 may be located near the rear 132.

Figure 3:
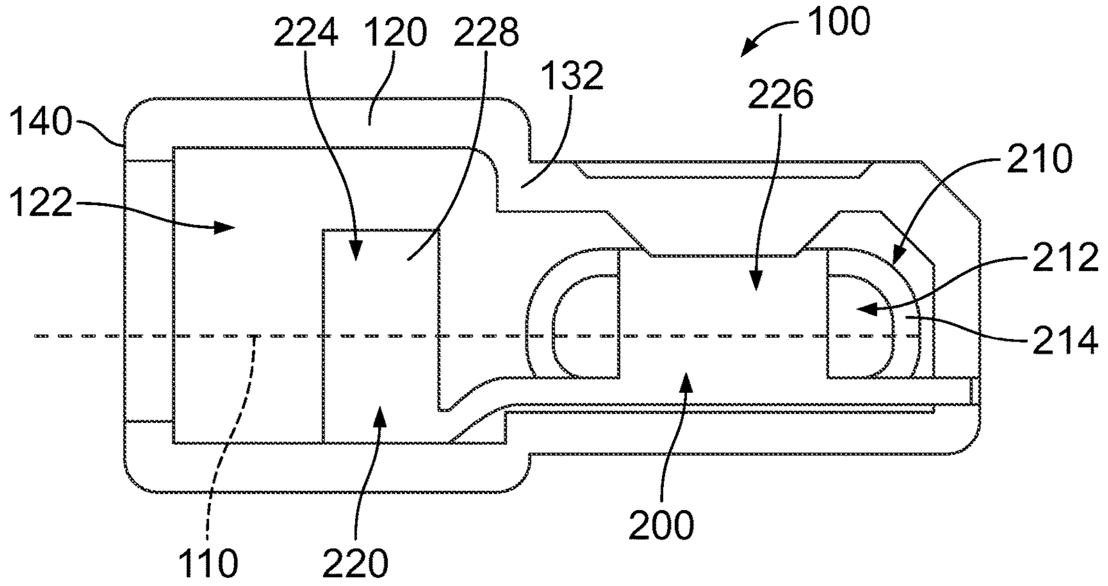
FIG. 3 illustrates a rear view of the power receptacle assembly 100 in accordance with an exemplary embodiment.
Figure 4:
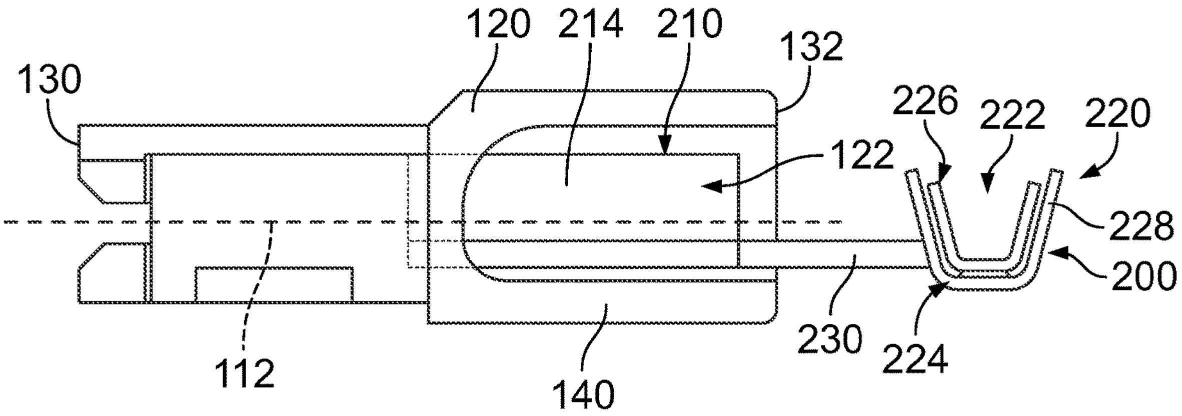
FIG. 4 illustrates a side view of the power receptacle assembly in accordance with an exemplary embodiment.

With additional reference to FIG. 3, which is a rear view of the power receptacle assembly 100, and FIG. 4, which is a side view of the power receptacle assembly 100, the power terminal 200 is shown poised for loading into the cavity 122 of the receptacle housing 120. The power terminal 200 is manufactured from a metal material and is electrically conductive. For example, the power terminal 200 may be manufactured from copper or a copper alloy, or aluminum or an aluminum alloy. Optionally, the power terminal 200 may be plated. In an exemplary embodiment, the power terminal 200 is a stamped and formed part that is stamped from a metal plate and formed into a particular shape. The power terminal 200 is configured to be terminated to the power cable 102 and is configured for mating with the mating power contact 106.

The power terminal 200 extends between a mating end 210 and a terminating end 220. The mating end 210 is configured to be mated with the mating power contact 106. In the illustrated embodiment, the mating end includes a socket 212 configured to receive the blade of the mating power contact 106. In various embodiments, the mating end 210 is a quick connect terminal. The mating end 210 may include curled mating beams 214 at opposite sides of the power terminal 200 forming the socket 212. In alternative embodiments, the mating end 210 may include a boxlike structure forming the socket 212 and having one or more mating beams extending into the boxlike structure for mating engagement with the mating power contact 106.

In an exemplary embodiment, the terminating end 220 includes a crimp barrel 222 configured to be crimped to the end of the power cable 102. In an exemplary embodiment, the crimp barrel 222 includes a cable crimp 224 crimped to an insulator 114 of the power cable 102 and a conductor crimp 226 crimped to a conductor 116 of the power cable 102. In various embodiments, the crimp barrel 222 is a C-crimp structure. The crimp barrel 222 includes multiple crimp beams 228 configured to be folded or bent over the power cable 102 to make a mechanical and/or electrical connection with the power cable 102. In an exemplary embodiment, the power terminal 200 includes connecting arms 230 between the socket 212 in the crimp barrel 222.

The connecting arms 230 orient and/or position the crimp barrel 222 relative to the socket 212, such as at the right angle orientation.

In an exemplary embodiment, the power terminal 200 is a right angle terminal. For example, the mating end 210 is oriented perpendicular to the terminating end 220. For example, the socket 212 is configured to receive the mating power contact 106 along the mating axis 112 and the crimp barrel 222 is configured to receive the power cable 102 along the cable axis 110, which is perpendicular to the mating axis 112. As such, the power cable 102 is able to exit the receptacle housing 120 at the sides 140 leaving the area behind the power receptacle assembly 100 open and free of the power cable 102. As such, the power receptacle assembly 100 has a low-profile between the front 130 and the rear 132. Other components may be located rearward of the power receptacle assembly 100, such as for assembly of the power receptacle assembly 100 and/or mating of the power receptacle assembly 100 with the mating connector 104. For example, a device or installer may press against the rear of the power receptacle assembly 100 for mating with the mating connector 104 and the rear cover 300 provides a flat surface for pressing against the power receptacle assembly 100 during such mating operation.

With reference back to FIG. 2, the rear cover 300 is shown poised for coupling to the receptacle housing 120. The rear cover 300 includes a cover body 302. In an exemplary embodiment, the cover body 302 is manufactured from a dielectric material, such as a plastic material. The cover body 302 may be manufactured by a molding process. In an exemplary embodiment, the cover body 302 of the rear cover 300 includes a cover panel 320, the TPA element 310 extending from the cover panel 320, and latches 340 extending from the cover panel 320.

The cover panel 320 includes an inner surface 322 and an outer surface 324. Optionally, the outer surface 324 is planar. The inner surface 322 is configured to face the receptacle housing 120. The inner surface 322 may abut against the rear 132 of the receptacle housing 120 when the rear cover 300 is coupled to the receptacle housing 120. The cover panel 320 may correspond to a height and width profile of the receptacle housing 120 to follow the general footprint or profile of the rear 132 of the receptacle housing 120. The cover panel 320 extends between a first side 326 and a second side 328. The cover panel 320 includes a first portion 330 at the first side 326 and a second portion 332 at the second side 328. In the illustrated embodiment, the first portion 330 is shorter than the second portion 332. However, the cover panel 320 may have a uniform height in alternative embodiments. Optionally, the first portion 330 may be wider than the second portion 332, or vice versa. However, in alternative embodiments, the first and second portions 330, 332 may have approximately equal widths.

The TPA element 310 extends from the inner surface 322 and is configured to be plugged into the cavity 122 of the receptacle housing 120 to interface with the power terminal 200. In an exemplary embodiment, the TPA element 310 is co-molded with the cover panel 320 as part of a single molding operation. The TPA element 310 is integral with the cover panel 320 forming a unitary, monolithic structure. However, in alternative embodiments, the TPA element 310 may be separate and discrete from the cover panel 320 and coupled thereto. The TPA element 310 extends forward of the cover panel 320. The TPA element includes a terminal interface 312 configured to interface with the power terminal 200. In an exemplary embodiment, the terminal interface 312 is provided at a distal end 314 of the TPA element 310.

In an exemplary embodiment, the TPA element 310 includes a cable crimp stuffer 316 configured to engage the cable crimp 224 of the power terminal 200 and ensure that the cable crimp 224 is fully loaded into the cavity 122 of the receptacle housing 120. For example, if the power terminal 200 is only partially loaded into the cavity 122, the cable crimp stuffer 316 engages the cable crimp 224 and is unable to be fully loaded into the cavity 122, which limits the rear cover 300 from coupling to the receptacle housing 120 and provides a visual indication to the installer that the power terminal 200 is not fully loaded into the receptacle housing 120. In such situation, the rear cover 300 may be pressed inward against the power terminal 200 to fully load the cable crimp 224 of the power terminal 200 into the cavity 122 and allow the rear cover 300 to be latchably coupled to the receptacle housing 120.

In an exemplary embodiment, the TPA element 310 includes a conductor crimp stuffer 318 configured to engage the conductor crimp 226 of the power terminal 200 and ensure that the conductor crimp 226 is fully loaded into the cavity 122 of the receptacle housing 120. For example, if the power terminal 200 is only partially loaded into the cavity 122, the conductor crimp stuffer 318 engages the conductor crimp 226 and is unable to be fully loaded into the cavity 122, which limits the rear cover 300 from coupling to the receptacle housing 120 and provides a visual indication to the installer that the power terminal 200 is not fully loaded into the receptacle housing 120. In such situation, the rear cover 300 may be pressed inward against the conductor crimp 226 of the power terminal 200 to fully load the power terminal 200 into the cavity 122 and allow the rear cover 300 to be latchably coupled to the receptacle housing 120.

In an exemplary embodiment, the TPA element 310 is contoured to match a shape of the power terminal 200. For example, the cable crimp stuffer 316 may be offset relative to the conductor crimp stuffer 318. For example, the distal end 314 at the cable crimp stuffer 316 is offset from the distal end 314 at the conductor crimp stuffer 318. In the illustrated embodiment, the conductor crimp stuffer 318 extends further forward than the cable crimp stuffer 316. The cable crimp stuffer 316 is sized and shaped to interface with the cable crimp 224 and the conductor crimp stuffer 318 is sized and shaped to interface with the conductor crimp 226. For example, the cable crimp stuffer 316 and/or the conductor crimp stuffer 318 may include an enlarged areas (for example, taller areas) configured to interface with the crimp beams 228 along the cable crimp 224 and the conductor crimp 226, respectively. In an exemplary embodiment, the TPA element 310 includes guide features 319 to guide loading of the TPA element 310 into the cavity 122. The guide surfaces 319 engage features or surfaces of the receptacle housing 120 in the cavity 122 to position the rear cover 300 relative to the receptacle housing 120.

The latches 340 are provided to latchably couple the rear cover 300 to the receptacle housing 120. The latches 340 are positioned on the rear cover 300 to interface with the corresponding latching elements 150. In an exemplary embodiment, multiple latches 340 are provided. For example, the latches 340 may be provided along a top edge and/or a bottom edge of the cover panel 320. The latches 340 may be provided proximate to the first side 326 and/or the second side 328. In an exemplary embodiment, the latches 340 are deflectable latches. Each latch 340 may include an opening 342 that receives the corresponding latching element 150. Other types of latching features may be used in alternative embodiments. The latches 340 are configured to be released from the latching elements 150 to allow removal of the rear cover 300, such as for repair and/or replacement of the power terminal 200 and/or the power cable 102, and allows reuse of the rear cover 300 after the repair and/or replacement.

Figure 5:
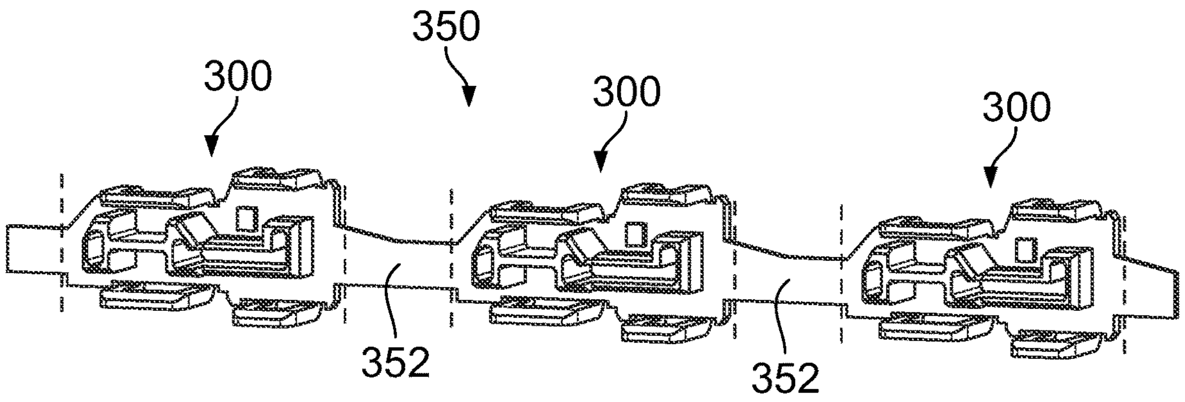
FIG. 5 is a front perspective view of a plurality of the rear cover arranged along a carrier strip in accordance with an exemplary embodiment.
Figure 6:
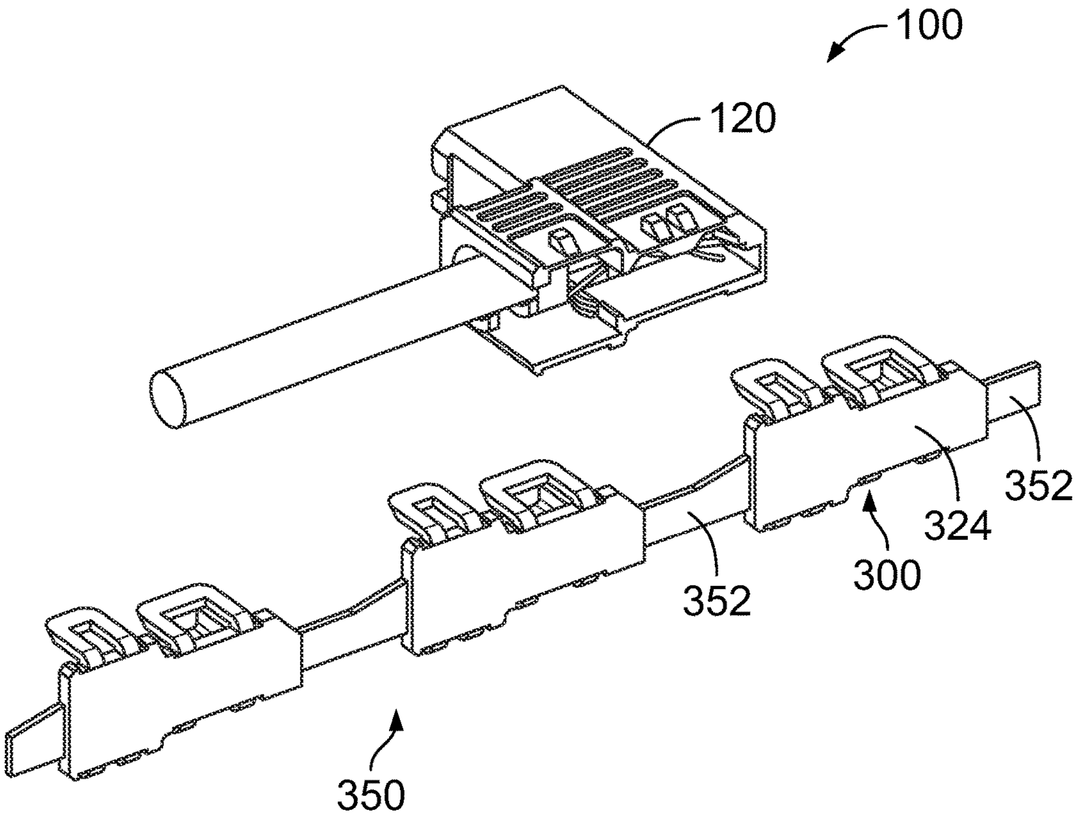
FIG. 6 is a rear perspective view of the carrier strip showing one of the rear cover poised for assembly with the receptacle housing of the corresponding power receptacle assembly in accordance with an exemplary embodiment.

FIG. 5 is a front perspective view of a plurality of the rear cover 300 arranged along a carrier strip 350 in accordance with an exemplary embodiment. FIG. 6 is a rear perspective view of the carrier strip 350 showing one of the rear cover 300 poised for assembly with the receptacle housing 120 of the corresponding power receptacle assembly 100.

In an exemplary embodiment, the rear cover 300 is manufactured in strip format on a carrier strip 350. The carrier strip 350 includes connecting strips 352 between each of the rear cover 300. The connecting strips 352 are co-molded with the rear covers 300 to form the carrier strip 350. For example, the connecting strips 352 and the rear cover 300 are integral having a unitary, monolithic structure. The rear covers 300 are singulated by cutting or breaking the rear covers 300 from the connecting strips 352 (for example, at the dashed lines). The carrier strip 350 may be wound on a reel and supplied to an automated assembly machine configured to singulate the rear covers 300 and couple the rear covers 300 to the receptacle housings 120. Optionally, the separating or cutting action may occur contemporaneously with the coupling action during the same assembly step, such as using an assembly device configured to both cut and press the rear cover 300 onto the receptacle housing 120. Such automated assembly eliminates the need of an assembler having to pick up a loose piece rear cover, oriented, and press it onto the assembly manually. The planar outer surface 324 of the rear cover 300 provides a flat, ergonomic push surface for assembly of the rear cover 300 with the receptacle housing 120.

A method of assembling the power receptacle assembly may include the steps of providing a receptacle housing having housing walls forming a cavity, the receptacle housing extending between a front and a rear, the receptacle housing having a front opening at the front configured to receive a mating power contact, the receptacle housing having a rear opening at the rear, the receptacle housing including a power cable exit; loading a power terminal in the cavity through the rear opening such that a socket of the power terminal faces the front opening for mating with the mating power contact and such that a crimp barrel of the power terminal faces the rear opening; presenting a carrier strip having a plurality of rear covers connected in series by connecting strips; singulating one of the rear covers from the carrier strip by separating the rear cover from the connecting strips; and coupling the separated rear cover to the rear of the receptacle housing to cover the rear opening to hold the power terminal in the cavity. Optionally, the rear cover may be singulated from the connecting strips and pressed onto the receptacle housing in a single step. The rear cover may be coupled to the rear of the receptacle housing such that a terminal position assurance (TPA) element, extending from an inner surface of the rear cover, is loaded into the cavity to interface with the power terminal to assure proper positioning of the power terminal in the cavity. The method may include the step of latching the rear cover to the receptacle housing to secure the rear cover to the receptacle housing. The singulating step may include cutting the carrier strip between the rear cover and the connecting strips.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power receptacle assembly comprising:

a receptacle housing having housing walls forming a cavity, the receptacle housing extending between a front and a rear, the receptacle housing having a front opening at the front configured to receive a mating power contact, the receptacle housing having a rear opening at the rear, the receptacle housing including a power cable exit;

a power cable extending from the power cable exit;

a power terminal received in the cavity through the rear opening and entirely positioned forward of the rear of the receptacle housing, the power terminal having a socket at a mating end configured to be mated with the mating power contact, the power terminal including a crimp barrel crimped to the power cable; and a rear cover including a cover panel coupled to the rear of the receptacle housing to cover the rear opening, the rear cover including a terminal position assurance (TPA) element protruding forward of the cover panel, the TPA element received in the cavity, the TPA element including a terminal interface configured to interface with the power terminal and assure proper positioning of the power terminal in the cavity, wherein the TPA element limits the rear cover from coupling to the receptacle housing if the power terminal is only partially loaded into the cavity to provide a visual indication to the installer that the power terminal is not fully loaded into the receptacle housing.

2. The power receptacle assembly of claim 1, wherein the rear cover is fed on a carrier strip with a plurality of the rear covers with connecting strips between the rear covers, the rear cover is configured to be singulated from the connecting strips to separate the rear cover from the carrier strip for coupling to the rear of the receptacle housing.

3. The power receptacle assembly of claim 1, wherein the rear cover includes an inner surface and an outer surface, the TPA element extending from the inner surface.

4. The power receptacle assembly of claim 1, wherein the rear cover includes an inner surface and an outer surface, the outer surface being generally planar.

5. The power receptacle assembly of claim 1, wherein the receptacle housing includes a latching element, the rear cover including a latch, the latch interfacing with the latching element to secure the rear cover to the receptacle housing.

6. The power receptacle assembly of claim 1, wherein the crimp barrel includes a cable crimp crimped to an insulator of the power cable and a conductor crimp crimped to a conductor of the power cable, the TPA element including a cable crimp stuffer engaging the cable crimp and a conductor crimp stuffer engaging the conductor crimp to ensure proper positioning of the power terminal in the cavity.

7. The power receptacle assembly of claim 6, wherein a distal end of the cable crimp stuffer is offset from a distal end of the conductor crimp stuffer.

8. The power receptacle assembly of claim 1, wherein the crimp barrel extends along a cable axis, the socket configured to receive the mating power contact along a mating axis perpendicular to the cable axis.

9. The power receptacle assembly of claim 1, wherein the rear cover extends between a first side and a second side, the rear cover including a first portion at the first side and a second portion at the second side, the first portion being shorter than the second portion.

10. A power receptacle assembly comprising:

a receptacle housing having housing walls forming a cavity, the receptacle housing extending between a front and a rear, the receptacle housing having a front opening at the front configured to receive a mating power contact, the receptacle housing having a rear opening at the rear, the receptacle housing including a power cable exit;

a power cable extending from the power cable exit;

a power terminal received in the cavity through the rear opening and entirely positioned forward of the rear of the receptacle housing, the power terminal having a socket at a mating end configured to be mated with the mating power contact, the power terminal including a crimp barrel crimped to the power cable; and a rear cover including a cover panel and a protrusion protruding forward of the cover panel, the cover panel configured to be coupled to the rear of the receptacle housing to cover the rear opening, the protrusion extending into the cavity to interface with the power terminal in the cavity, the rear cover being fed on a carrier strip with a plurality of the rear covers with connecting strips between the rear covers, wherein the rear cover is configured to be singulated from the connecting strips to separate the rear cover from the carrier strip for coupling to the rear of the receptacle housing, wherein the rear cover includes a terminal position assurance (TPA) element, the TPA element received in the cavity, the TPA element including a terminal interface configured to interface with the power terminal and assure proper positioning of the power terminal in the cavity, the TPA element limits the rear cover from coupling to the receptacle housing if the power terminal is only partially loaded into the cavity to provide a visual indication to the installer that the power terminal is not fully loaded into the receptacle housing.

11. The power receptacle assembly of claim 10, wherein the rear cover includes an inner surface and an outer surface, the TPA element extending from the inner surface, the outer surface being generally planar.

12. The power receptacle assembly of claim 10, wherein the rear cover extends between a first side and a second side, the connecting strips extending from the first side and the second side.

13. The power receptacle assembly of claim 10, wherein the rear cover is integral with the connecting strips as a unitary, monolithic structure on the carrier strip prior to the rear cover being separated from the carrier strip.

14. The power receptacle assembly of claim 10, wherein the connecting strips are narrower than the rear cover.

15. The power receptacle assembly of claim 10, wherein the crimp barrel includes a cable crimp crimped to an insulator of the power cable and a conductor crimp crimped to a conductor of the power cable, the TPA element including a cable crimp stuffer engaging the cable crimp and a conductor crimp stuffer engaging the conductor crimp to ensure proper positioning of the power terminal in the cavity.

16. A method of assembling a power receptacle assembly, the method comprising:

providing a receptacle housing having housing walls forming a cavity, the receptacle housing extending between a front and a rear, the receptacle housing having a front opening at the front configured to receive a mating power contact, the receptacle housing having a rear opening at the rear, the receptacle housing including a power cable exit;

loading a power terminal in the cavity through the rear opening such that a socket of the power terminal faces the front opening for mating with the mating power contact and such that a crimp barrel of the power terminal faces the rear opening, the power terminal received in the cavity through the rear opening such that the power terminal is entirely positioned forward of the rear of the receptacle housing;

presenting a carrier strip having a plurality of rear covers connected in series by connecting strips, each rear cover including a cover panel and a protrusion protruding forward of the cover panel;

singulating one of the rear covers from the carrier strip by separating the rear cover from the connecting strips; and coupling the separated rear cover to the rear of the receptacle housing such that the cover panel covers the rear opening to hold the power terminal in the cavity and such that the protrusion extends into the cavity to interface with the power terminal in the cavity, wherein the rear cover is coupled to the rear of the receptacle housing such that a terminal position assurance (TPA) element, extending from an inner surface of the rear cover, is loaded into the cavity, the TPA element including a terminal interface configured to interface with the power terminal and assure proper positioning of the power terminal in the cavity, wherein the TPA element limits the rear cover from coupling to the receptacle housing if the power terminal is only partially loaded into the cavity to provide a visual indication to the installer that the power terminal is not fully loaded into the receptacle housing.

17. The method of claim 16, wherein the rear cover is singulated from the connecting strips and pressed onto the receptacle housing in a single step.

18. The method of claim 16, further comprising latching the rear cover to the receptacle housing to secure the rear cover to the receptacle housing.

19. The method of claim 16, wherein said singulating the rear cover from the carrier strip includes cutting the carrier strip between the rear cover and the connecting strips.

20. The method of claim 16, wherein the crimp barrel includes a cable crimp crimped to an insulator of the power cable and a conductor crimp crimped to a conductor of the power cable, the TPA element including a cable crimp stuffer and a conductor crimp stuffer, said coupling the separated rear cover to the rear of the receptacle housing includes engaging the cable crimp stuffer with the cable crimp and engaging the conductor crimp stuffer with the conductor crimp.

* * * * *